United States Patent [19]
Cates et al.

[11] Patent Number: 6,166,870
[45] Date of Patent: Dec. 26, 2000

[54] METHOD FOR WRITING A SERVO PATTERN USING A WRITER HAVING A SPLIT TOP POLE

[75] Inventors: James C. Cates, Louisville; John Paul Mantey, Boulder; Ronald Dean Gillingham, Longmont; Steven Gregory Trabert, Boulder, all of Colo.

[73] Assignee: Storage Technology Corporation, Louisville, Colo.

[21] Appl. No.: 09/373,171

[22] Filed: Aug. 12, 1999

Related U.S. Application Data

[62] Division of application No. 08/804,433, Feb. 21, 1997, Pat. No. 5,963,400.

[51] Int. Cl.[7] ..................................................... G11B 5/09
[52] U.S. Cl. ........................ 360/48; 57/77.12; 57/78.02
[58] Field of Search ................... 360/48, 51, 31, 360/57, 72.1, 72.2, 77.01, 77.12, 78.02

[56] References Cited

U.S. PATENT DOCUMENTS

| | | | |
|---|---|---|---|
| 4,280,158 | 7/1981 | de Niet | 360/113 |
| 4,996,609 | 2/1991 | Joannou | 360/121 X |
| 5,453,887 | 9/1995 | Negishi et al. | 360/77.12 X |
| 5,629,813 | 5/1997 | Baca et al. | 360/77.12 |
| 5,963,400 | 10/1999 | Cates et al. | 360/113 |
| 5,973,869 | 10/1999 | Gillingham et al. | 360/72.2 X |
| 6,023,385 | 2/2000 | Gillingham et al. | 360/48 |

*Primary Examiner*—Alan T Faber
*Attorney, Agent, or Firm*—Brooks & Kushman P.C.

[57] ABSTRACT

A method for writing a servo pattern onto a length of magnetic tape includes writing a first frequency signal onto a first portion along the length of the tape, and writing a second frequency signal by simultaneously writing a plurality of spaced apart predetermined shapes. The predetermined spaced apart shapes are achieved by writing the second frequency using a writer having a split top pole. Passing the tape over the spaced apart top pole elements allows the writer to simultaneously write the plurality of spaced apart shapes. The tape can then be passed over a read module.

9 Claims, 6 Drawing Sheets in#6,166,870

METHOD FOR WRITING A SERVO PATTERN USING A WRITER HAVING A SPLIT TOP POLE

This is a divisional of application Ser. No. 08/804,433, filed on Feb. 21, 1997 now U.S. Pat. No. 5,963,400.

BACKGROUND OF THE INVENTION

1. Field of the Invention

The invention relates to the field of dynamic magnetic information storage or retrieval. More particularly, the invention relates to the field of magnetic tape heads. In still greater particularity, the invention relates to magnetic tape head configuration. By way of further characterization, but not by way of limitation thereto, the invention includes a split top pole tape head for writing unique servo patterns.

2. Description of the Related Art

Magnetic tape recording has been utilized for many years to record voice and data information. For information storage and retrieval, magnetic tape has proven especially reliable, cost efficient and easy to use. In an effort to make magnetic tape even more useful and cost effective, there have been attempts to store more information per given width and length of tape. This has generally been accomplished by including more data tracks on a given width of tape. While allowing more data to be stored, this increase in the number of data tracks results in those tracks being more densely packed onto the tape. As the data tracks are more closely spaced, precise positioning of the tape with respect to the tape head becomes more critical as errors may be more easily introduced into the reading or writing of data. The tape to tape head positioning may be affected by variations in the tape or tape head, tape movement caused by air flow, temperature, humidity, tape shrinkage, and other factors, especially at the outside edges of the tape.

In order to increase data track accuracy, servo tracks have been employed to provide a reference point to maintain correct positioning of the tape with respect to the tape head. One or more servo tracks may be used depending upon the number of heads used to record and retrieve data from the multiple data tracks on the tape. Referring to FIG. 1, a one-half inch wide magnetic tape 11 may contain up to 288 or more data tracks on multiple data bands 12. With such a large number of data tracks it may be desirable to include up to five or more servo bands 13 to improve data read and write function performance. Servo bands 13 may utilize various patterns or frequency regions to allow precise tape to tape head positioning. Servo bands 13 may include one or more servo tracks.

An example of a servo pattern is shown in FIG. 2. This servo pattern is more specifically described in copending U.S. patent application entitled "Tape Servo Pattern with Enhanced Synchronization Properties", Ser. No. 08/804,445, now U.S. Pat. No. 6,023,385, filed on the same date herewith and assigned to the same assignee as the present application. That Application is hereby incorporated by reference as if fully set forth herein. Referring to FIG. 2, multiple recorded patterns are included as well as erased areas. In this pattern, a wide synchronization signal is denoted as a synchronization frequency region 14. A second, different frequency area 15 is written following region 14. A plurality of erase patterns 16 are written in a precise configuration such as parallelograms over portions of area 15.

During operation of the tape drive, the location of the tape head relative to the tape is controlled by servo readers which monitor the output signal when the reader is positioned at the edge of erase patterns 16. The position of erase patterns 16 relative to one another is very critical because edges are used to position the head relative to the tape. That is, during read or write operations the head may be moved relative to the tape to allow accurate reading or writing of the data tracks. In addition to the positioning of erase patterns 16, uniformity of the signal within the different frequency area 15 and erase patterns 16 is critical. Improper location of the erase patterns 16 or variations in the readback amplitude of the servo pattern may result in tracks of recorded data being improperly positioned on the tape or in erroneous reading of recorded data tracks.

In order to write a servo pattern as described above and shown in FIG. 2, the write heads for the servo pattern must be closely matched and tightly specified in order to achieve acceptable performance. The servo pattern is written in a manufacturing environment and thus the servo pattern must be written in one pass of the tape to be cost effective. It is also important to have feedback to the write driver circuitry to allow verification of the correctness of the servo pattern being written. Of course, ease of manufacture of the servo write and read head itself is also of primary importance while maintaining performance parameters.

Thin film write heads are being used today to write servo patterns. A thin film write head is processed primarily in a clean room atmosphere using thin film deposition and photolithography techniques with minimal mechanical processing. This type head is an advancement over previous write head fabrication techniques that had much more intensive mechanical processing. The difference is most notable in the definition of write poles. For a thin film write head the write pole geometry is defined using photolithography processes which allow a tight control over the critical write pole width, in contrast to previous write head designs where the write track width was defined mechanically with less accuracy. Thin film write heads can also be better optimized for recording servo patterns at high recording density and tape speed on high coercivity media.

It may be possible to utilize existing thin film tape head manufacturing techniques to allow multiple erase heads to be placed adjacent to one another, one for each erase band 16 in a servo pattern. However, such multiple tape head configurations would require severe design compromises from the performance of the tape head and/or the manufacturability of the head itself. Referring to FIG. 3 a portion of a cross-section of a prior art thin film write track of a tape head is shown. The tape head includes a closure 17 and a substrate 18 made of aluminum titanium carbide (AlTiC) or other suitable material. Between closure 17 and substrate 18 are a plurality of layers deposited upon substrate 18 in a clean room. These layers include an alumina underlayer 19 deposited upon substrate 18 and a planar bottom pole 20 deposited upon alumina underlayer 19. A gap layer 21 made of an insulating material such as alumina is deposited on planar bottom pole 20. A coil structure 22 is deposited upon gap layer 21 in accordance with conventional practice. Coil structure 22 comprises a series of deposited layers of baked photoresist or other suitable material with a coil positioned therebetween as is known in the art. A top pole 40 has a resulting bulged shape. Because the topography of these deposited layers is nonplanar it is necessary to deposit a planarizing alumina overcoat layer 30 over the layers already deposited. Thick overcoat layer 30 is lapped flat to provide a planar surface for receiving closure 17. The magnetic tape passes over a tape bearing surface 10 for being read from, and written to, by the tape head.

Referring to FIG. 4, coils 22, top pole 40, top pole track width 41, and a back gap area 42 where top pole 40 contacts bottom pole 20 (FIG. 3) are shown. As stated above, one way to write the servo erase pattern of FIG. 2 would be to utilize multiple write heads. However, because the write head is actually substantially wider than write track width 41 of top pole 40, the use of multiple heads would create a physical interference between the electromagnetic coils 22 of adjacent heads if the heads were placed relatively close together. If the heads were farther apart, then the write pattern of each would also be spaced farther apart requiring servo band 13 to be wider thus reducing the available tape area for data tracks 12. In addition, the use of multiple heads would require multiple write drivers which would have to be precisely synchronized to ensure a correct servo pattern. It would be desirable to have a tape head which could accurately write a sophisticated servo pattern including multiple erase patterns 16 such as is shown in FIG. 2 while keeping the head manufacture cost effective and allowing the pattern to be efficiently written onto a given width of tape in one write procedure.

SUMMARY OF THE INVENTION

The invention is a thin film tape head which utilizes a split top pole configuration to allow multiple frequency bands to be written simultaneously in a single servo pattern. The tape head utilizes multiple modules to write and read the servo pattern.

At least one of the modules includes a novel split top pole configuration. In the preferred embodiment, a three module head design is used to write the servo pattern: one to write the first and second frequency bands; one to write the multiple erase patterns; and one to read the bands and pattern to provide feedback.

DESCRIPTION OF THE PREFERRED EMBODIMENT

Figure 1:
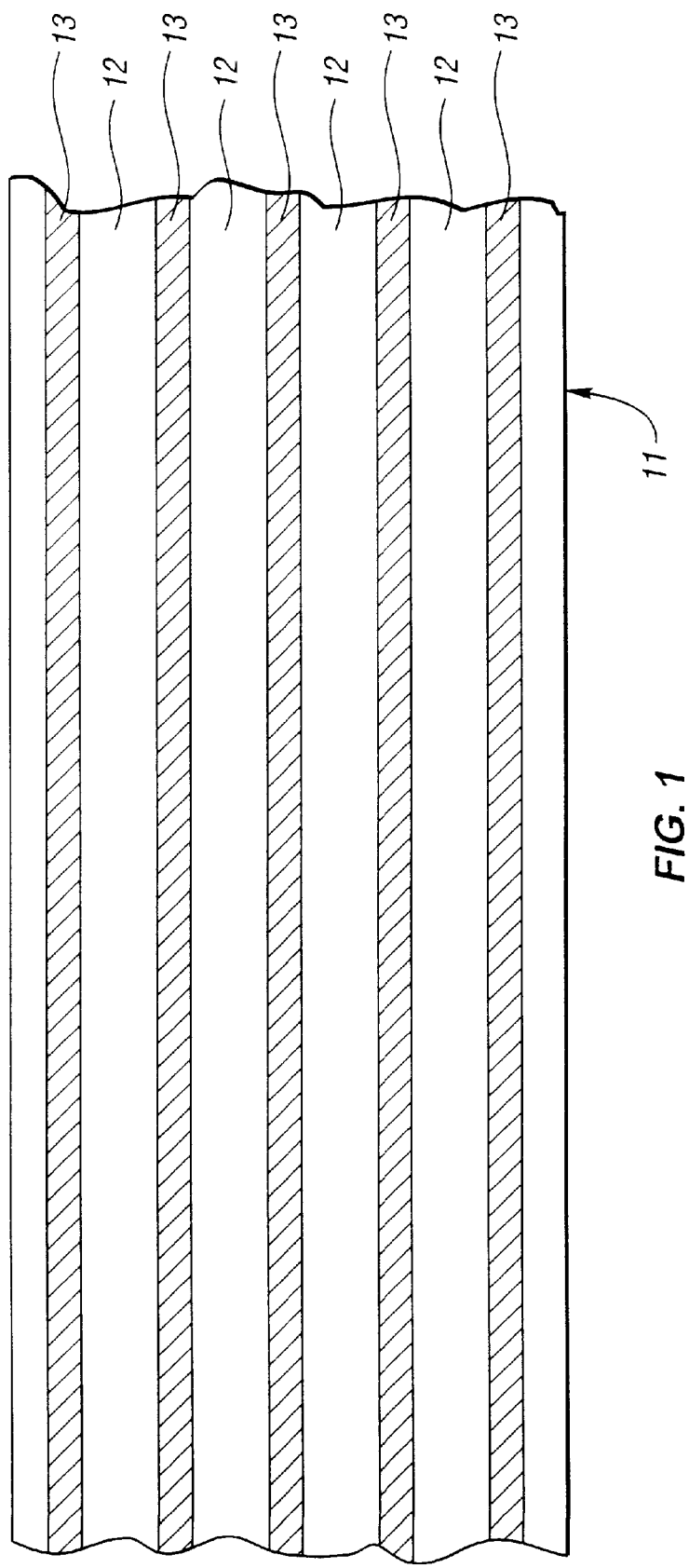
FIG. 1 is an illustration of multiple servo and data bands on magnetic tape.
Figure 2:
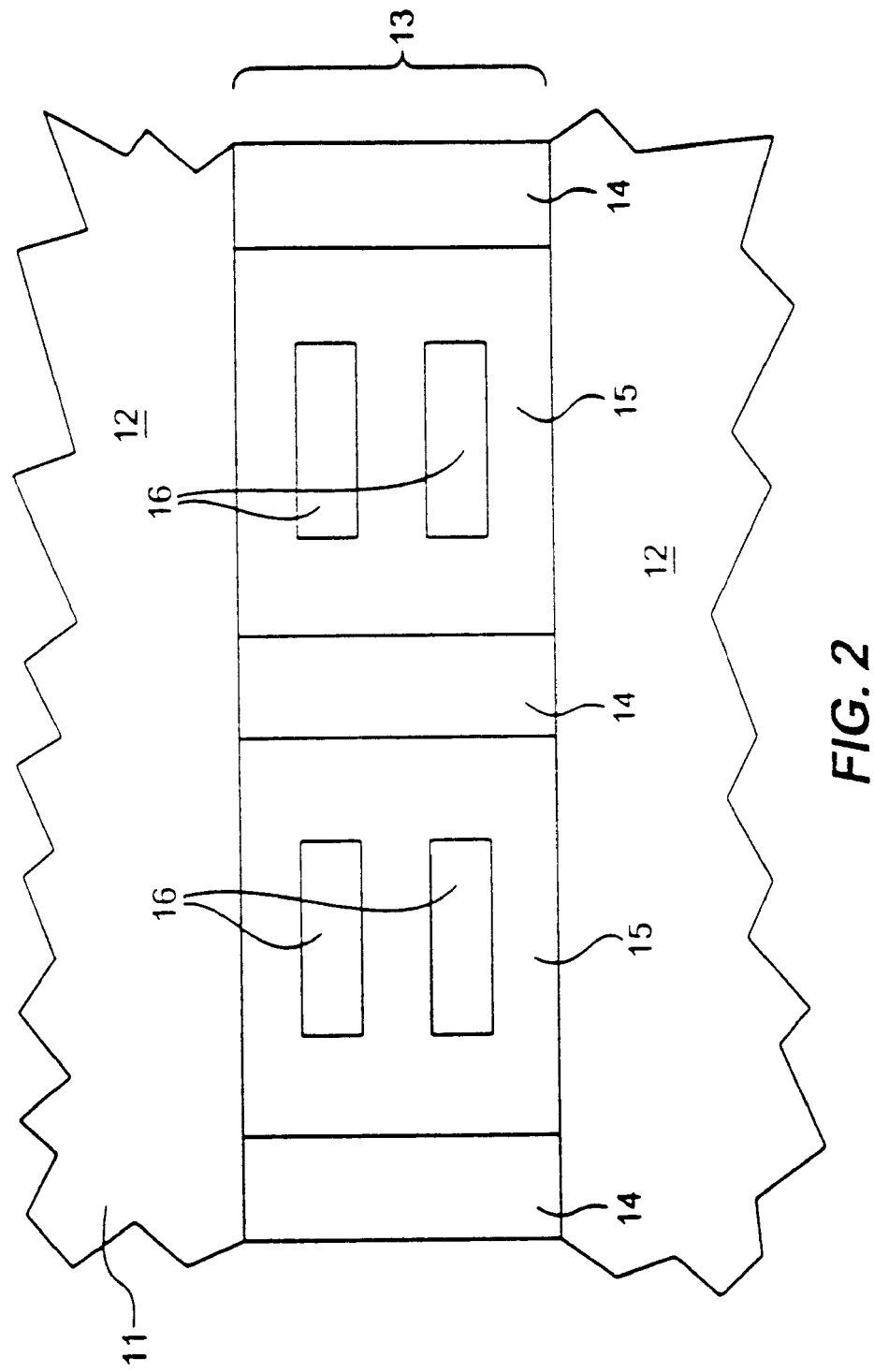
FIG. 2 is an illustration of a servo pattern including multiple erase tracks.

Referring to the drawings wherein like reference numerals denote like structure throughout each of the various drawings, FIG. 1 illustrates multiple servo bands 13 written onto a given tape portion 11 to allow precise positioning of data bands 12 with respect to a tape head (not shown). FIG. 2 illustrates a servo track pattern to be written as servo band 13 onto tape 11. Referring to FIG. 2, a first synchronization frequency is written on a first area 14 across the width of servo band 13. A second frequency 15 is written on a second area across the width of servo band 13. First synchronization frequency 14 and second frequency 15 are then alternately written onto servo band 13 along given length of tape 11. A third frequency is written in a predetermined precise pattern over second area 15. In the preferred embodiment, the third frequency is a high frequency AC erase or a DC erase frequency written as patterns 16 which may take the form of parallelograms such as a square or rectangle.

Figure 5:
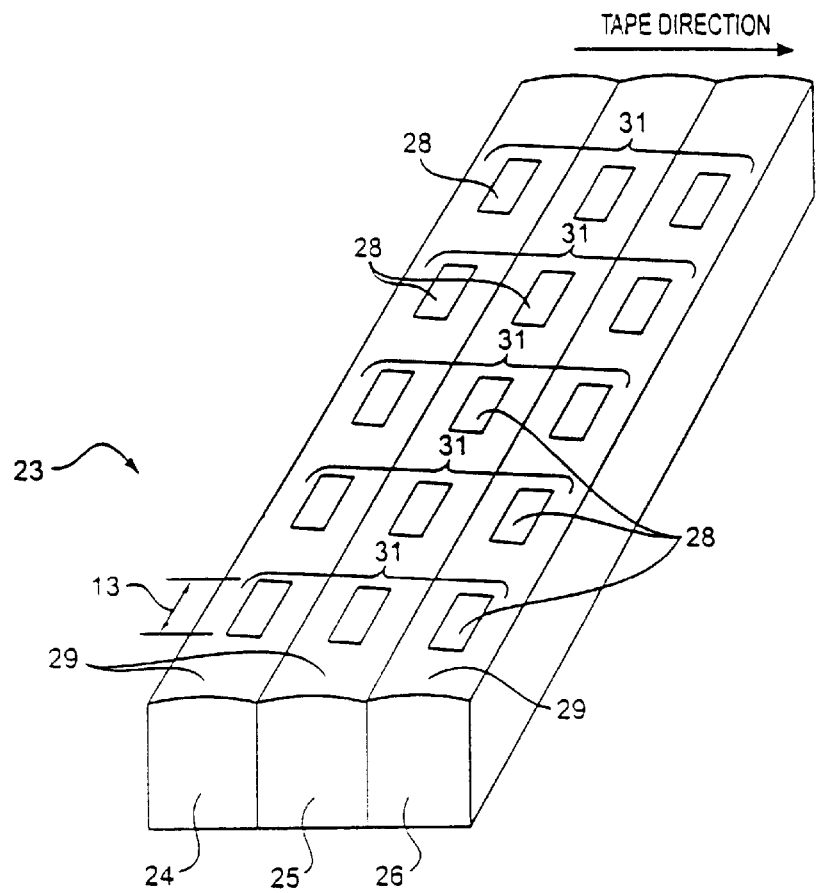
FIG. 5 is a perspective view of a three module tape head.

Referring to FIG. 5, a thin film tape head 23 is shown which is used to write the pattern shown in FIG. 1 including servo bands 13. Head 23 includes three modules 24, 25, 26. Each of the three modules 24, 25, 26 include a write or read head as will be described below. These modules consist of a substantiate, for example ferrite or AlTiC, on which the read and/or write heads are built using conventional thin film head processes with notable exceptions as discussed below. These substrates may then be glued or otherwise physically joined with a closure to provide structural support as is known in the art. Each of these modules includes an upper surface 29 which is machined to provide a suitable contour for the tape as is known in the art. The three modules are then assembled to form head 23 as shown in FIG. 5. Head 23 has five zones 28 which produce the five servo band format as shown in FIG. 1. Each zone 28 includes a write or read element as will be described below.

Referring again to FIG. 5, first module 24 includes five zones 28 therein. Each zone 28 includes a conventional write element as is known in the art. For example, the write element shown in FIG. 3 could be used. Width 41 of top pole 40 in FIG. 4 would determine the width of servo track 13. Referring to FIGS. 2 and 5, the write elements of first layer 24 are used to write first synchronization frequency 14 and second frequency 15 on servo band 13. Each zone of the five zones 28 in module 25 includes a split top pole write element in accordance with the present invention. The split top pole write element permits the simultaneous writing of multiple erase patterns 16 as shown in FIG. 2. Third module 26 includes zones 28 comprising read elements 34 to allow reading of the frequency areas written in servo band 13. A circled area 31 on surface 29 of head 23 includes zones 28 from all three modules of head 23. The passing of tape 11 over these three modules results in the writing of one servo band 13 for each zone 31. The five sets of three modules allows the writing of the five servo bands 13 shown in FIG. 1 as tape 11 is passed over head 23.

Figure 6:
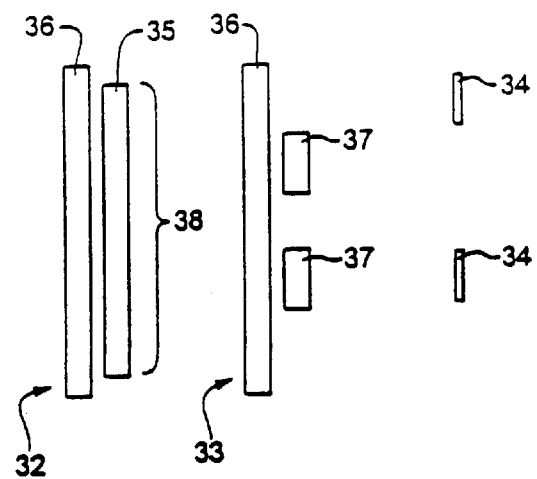
FIG. 6 is an illustration of a portion of the three module tape head shown in FIG. 5.

Referring to FIG. 6, a functional illustration of circled area 31 of FIG. 5 is shown. A leading write element 32 (corresponding to one zone 28 on module 24), a trailing write element 33 (corresponding to one zone 28 on module 25), and read elements 34 (corresponding to one zone 28 on module 26) are shown in functional detail. Leading writer 32 includes a conventional top pole 35 and bottom pole 36 as is known in the art. The width 38 of top pole 35 defines the width of servo band 13. For example, as discussed above, if the write head as shown in FIG. 4 was used, then top pole track width 41 would define the servo band width 13. Leading writer 32 is used to alternately write servo frequency 14 and second frequency 15 shown in FIG. 2.

Referring again to FIG. 6, trailing writer 33 includes conventional bottom pole 36 as in leading writer 32. A novel split top pole 37 is used in trailing writer 33 however. One skilled in the art will recognize that bottom pole 36 could also be patterned to form a split bottom pole which would be aligned with split top pole 37. Split top pole 37 allows the simultaneous writing of multiple erase patterns 16 over second frequency areas 15. Simultaneous writing results in more accuracy and requires only one write driver for trailing writer 33 instead of two (one for each head if two trailing writers were used). In addition, the alignment of trailing writer 33 to leading writer 32 is less critical with this design. The write head design parameters (gap length, number of coil turns, etc.) for the leading and trailing writers can be separately optimized for its particular function.

Figure 7:
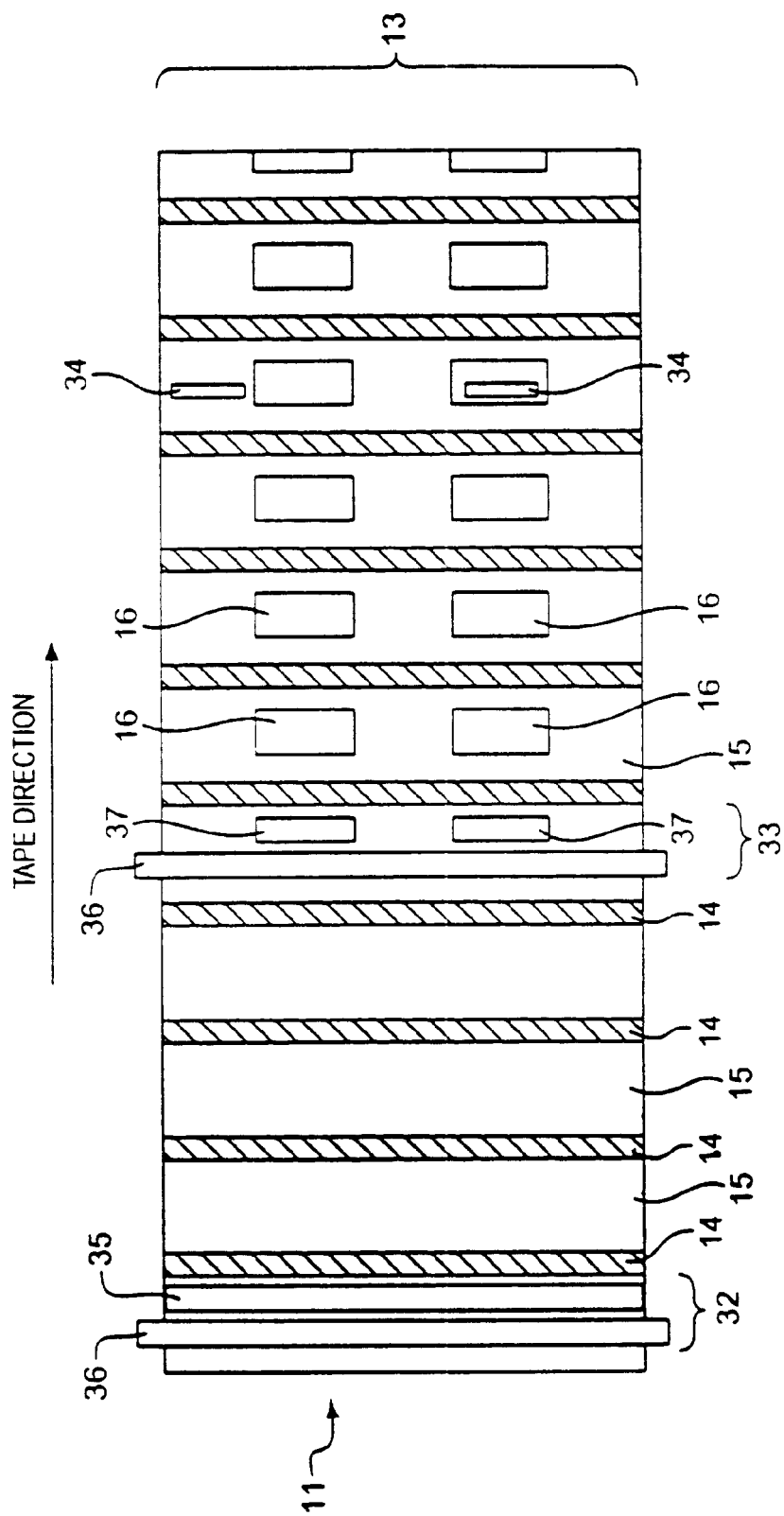
FIG. 7 is an illustration of the head portion of FIG. 6 superimposed upon a servo pattern.

Referring to FIG. 7, the operation of the write head 23 in writing a servo band 13 is shown. In FIG. 7, the top pole is used as the trailing pole for wide writer 35 and erase writer 37. Those skilled in the art will recognize that each writer could be reversed and bottom pole 36 used as the trailing write pole. As magnetic tape 11 passes over top pole 35 of leading writer 32, both servo frequency area 14 and second frequency area 15 are alternately written onto tape 11 in servo band 13. As tape 11 passes over trailing writer 33, split top poles 37 simultaneously write erase patterns 16 onto tape 11 in servo bands 13. Read elements 34 monitor the writing process for leading write head 32 and trailing write head 33 as part of a feedback loop to the write head. The location and number of read elements 34 are dependent on the specific feedback required for the servo writer system. The feedback allows the adjustment of the write currents and the relative timing of the patterns for the leading and trailing writers. The timing adjustment is particularly useful because imperfect parallelism of the head surface can result in timing issues between the leading and trailing writers when simultaneously writing servo bands across the tape. By using read heads 34 to monitor the signals being recorded on the tape, the timing of the waveform patterns to each of the leading 32 and trailing 33 writers can be individually adjusted to ensure that the timing of the servo pattern is correct across the width of the tape. Similarly, if the alignment of modules 24, 25 and 26 does not render them precisely parallel, feedback will allow the system to adjust for these imperfections.

Figure 3:
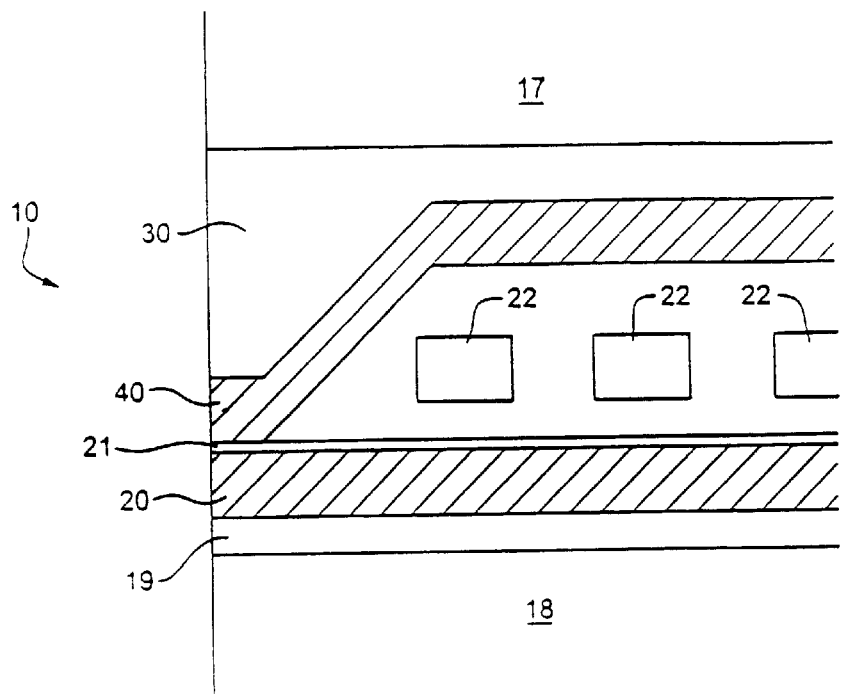
FIG. 3 is an illustration of a prior art thin film tape head.
Figure 4:
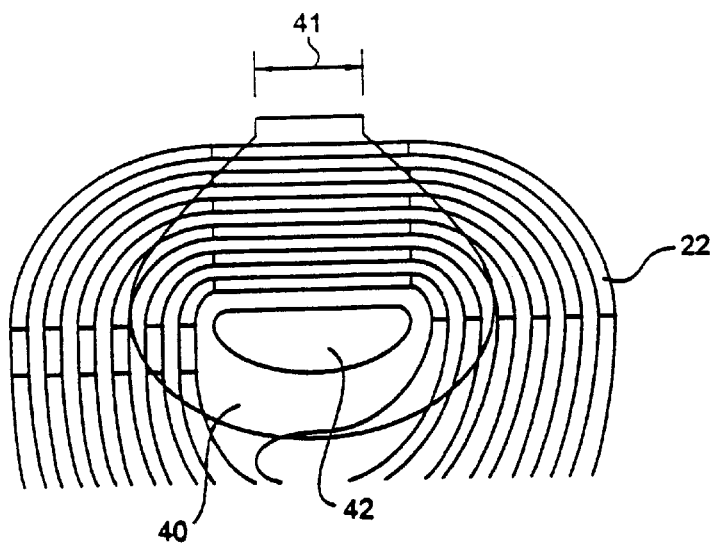
FIG. 4 is a top view of the prior art thin film write head of FIG. 3.
Figure 8:
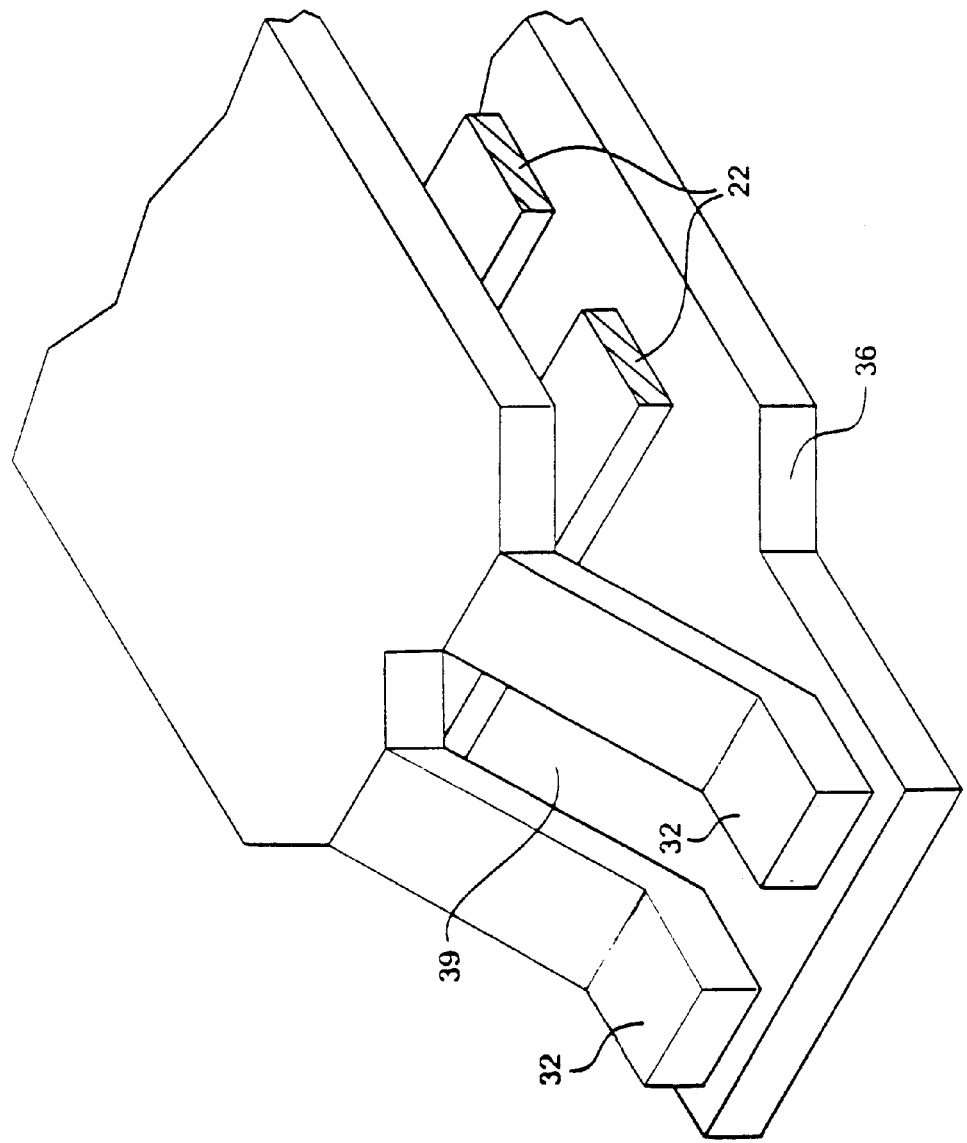
FIG. 8 illustrates a split top pole configuration.

Referring to FIG. 8 the novel split top pole configuration of the trailing writer is shown in greater detail. Split top poles 37 are shown in FIG. 8 adjacent to bottom pole 36. Split top pole 37 is preferably manufactured by using conventional thin film manufacturing process techniques. Coils 22 are deposited between top pole 37 and bottom pole 36. Split top poles 37 can be formed during the conventional process step used to define the shape of the top pole by removing material from the top pole in area 39. If the top pole is plated then split poles 37 can be plated in the same manner as the rest of the top pole. However, other manufacturing methods known in the art may also be used to produce a split top pole write element. After the split top pole has been formed, a planarizing layer such as layer 30 in FIG. 3 is employed to fill notched area 39 and the region surrounding the split top pole. As thus configured, a uniform supporting surface such as surface 29 in FIG. 5 can be found.

While the invention has been described with respect to a particular embodiment thereof, it is not to be so limited as changes and modifications may be made which are within the full intended scope of the invention as defined by the appended claims. For example, while specific numbers of servo tracks, data tracks and modules have been disclosed, the invention may be utilized with one or more servo or data tracks and more or less modules may be used in the servo write head. While the split pole write head has been described with two top pole portions, more than two top pole portions may be utilized. Similarly, while particular preferred tape head materials and tape head manufacturing methods have been disclosed, any suitable material or manufacturing method may be utilized without departing from the scope of the invention.

What is claimed is:

1. Method for writing a servo pattern onto a length of magnetic tape comprising the steps of:

passing said length of tape over a first write module;

writing a first frequency signal onto a first portion of said length of tape;

passing said length of tape over a second write module including a split top pole;

writing a second frequency signal after the first portion using said second write module so that said second frequency signal is written simultaneously by each pole element of the split top pole on a plurality of spaced apart portions of the tape; and passing said length of tape over a read module.

2. A method according to claim 1 wherein said step of passing said length of tape over a read module includes the steps of:

reading said first and second frequencies to verify said steps of writing; and providing feedback to a write driver to adjust the relative timing between said first frequency signal and said predetermined shapes.

3. A method according to claim 1 wherein said step of writing a first frequency signal onto a first portion of said length of tape further includes writing a signal including a frequency different from said first frequency and said second frequency onto a subsequent portion of said length of tape adjacent to said first portion.

4. A method according to claim 1 wherein said second frequency signal includes an erase frequency.

5. A method according to claim 1 wherein said plurality of spaced apart parallel predetermined shapes include a plurality of parallelograms.

6. A method according to claim 1 wherein said plurality of spaced apart parallel predetermined shapes include a plurality of rectangles.

7. A method according to claim 1 wherein said plurality of spaced apart parallel predetermined shapes include a plurality of squares.

8. A method according to claim 1 wherein said read module includes an inductive read module.

9. A method according to claim 1 wherein said read module includes a magnetoresistive read module.

* * * * *